Dec. 25, 1956   J. C. HIEMSTRA   2,775,314
BRAKE AND ANTI-SKID ATTACHMENT FOR A VEHICLE
Filed June 2, 1951
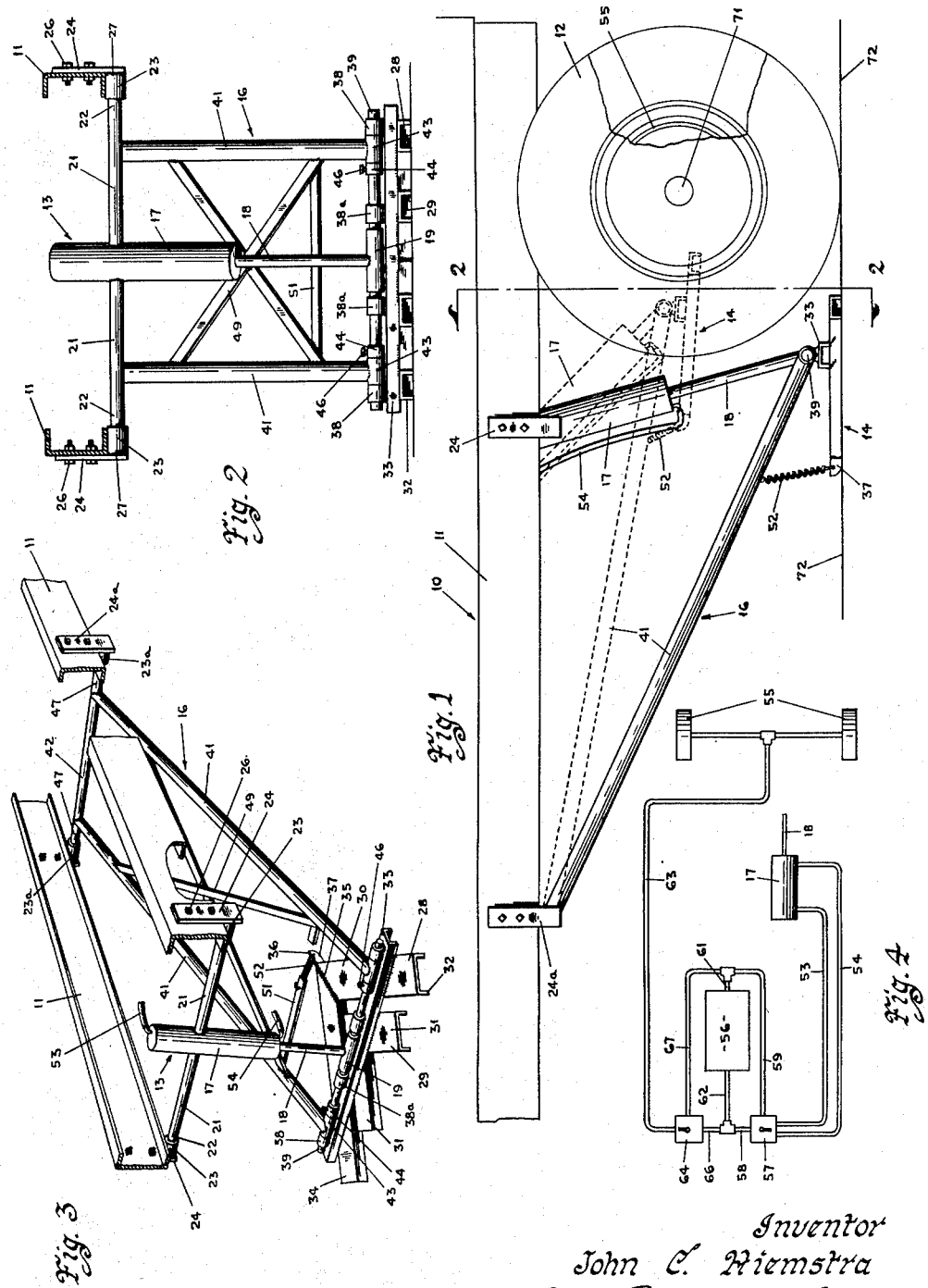
Inventor
John C. Hiemstra
By Rudolph L. Lowell
Attorney

United States Patent Office 2,775,314
Patented Dec. 25, 1956

2,775,314
BRAKE AND ANTI-SKID ATTACHMENT FOR A VEHICLE

John C. Hiemstra, Pella, Iowa

Application June 2, 1951, Serial No. 229,635

1 Claim. (Cl. 188—5)

This invention relates generally to braking and anti-skid devices for vehicles and in particular to a braking and anti-skid attachment for trucks, busses and semi-trailers to be used in addition to the regular brakes for vehicles of this type.

When roads are slippery due to being wet or icy the driving of semi-trailers, trucks and busses becomes extremely hazardous, especially on hills. Thus in the event a vehicle of this type becomes stalled in going up hill, the initial attempt in advancing up the hill, from the stalled position frequently results in a complete loss of traction and a rearward travel down hill of the vehicle. In the case of a semi-trailer this operation generally ends in a jackknifing of the trailer, and in the case of busses and trucks skidding off the road. With further reference to a semi-trailer, when the regular brakes are applied in traveling down hill under slippery road conditions, there is a tendency of the trailer to swing around the tractor and jackknife the semi-trailer, due apparently to the inertia of the trailer especially when loaded.

It is an object of this invention, therefore, to provide an improved brake and anti-skid attachment for a vehicle.

A further object of this invention is to provide a brake and anti-skid device for a vehicle which is capable of holding the vehicle against any down hill skidding movement and of braking the vehicle independently of the usual brakes therefor.

Yet another object of this invention is to provide a brake and anti-skid device for the trailer of a semi-trailer which is operated independently of the usual brakes therefor, and is directly engageable with the ground to hold the trailer against any jackknifing action, when the semi-trailer is in motion, or to hold the semi-trailer against motion in a stalled position.

Still another object of this invention is to provide a brake and anti-skid device for a vehicle which is of a compact and rugged design, readily and quickly installed on a vehicle from the underside of the main frame thereof such that the attachment in no way interferes with the usual maneuverability of the vehicle, and which is operated independently of the usual vehicle brakes, under emergency conditions, to reduce skidding of the vehicle or to stop the vehicle in the event of failure of the regular brakes therefor.

Yet a further object of this invention is to provide a ground engaging unit for a brake and anti-skid device which is of a construction to effect a high frictional engagement with the ground surface, regardless of weather and road conditions, with a progressive action so as to eliminate any sudden stresses or jarring motion of the vehicle when the brake attachment is applied.

Further objects, features and advantages of this invention will become apparent from the following description when taken in connection with the accompanying drawing in which:

Fig. 1 is a fragmentary side elevational view of the rear portion of a truck frame with parts broken away showing the assembly therewith of the attachment of this invention;

Fig. 2 is a sectional view as seen along the line 2—2 in Fig. 1;

Fig. 3 is a rear perspective view of the attachment of this invention; and

Fig. 4 is a diagrammatic showing of the fluid control system for the attachment of this invention.

With reference to the drawing the attachment of this invention is illustrated in Figs. 1 and 2 as applied to a truck frame 10 including longitudinal frame members 11 and rear wheels 12. The attachment is comprised of a cylinder assembly 13, a ground engaging unit 14 and a pivoted guide frame 16.

The cylinder assembly 13 includes a double acting cylinder 17 operatively associated with a piston having a piston rod 18 which terminates in a tubular transverse sleeve bearing 19. The cylinder 17 is supported intermediate its ends on coaxially aligned stub shafts 21 extended transversely from opposite sides thereof. The free end 22 of each shaft 21 is rotatably supported in a bearing 23 provided with a bracket member 24 for attachment as by bolts 26 to a longitudinal frame member 11.

As best appears in Fig. 2 a bracket member 24 is positioned against the outer side of a frame member 11 and with the bearing 23 extended laterally inwardly from the bracket 24 for location at the underside of a frame member 11. The bearings 23 are of a tubular type and are closed at their outer ends 27 by a corresponding bracket member 24, so that the stub shafts 21 are maintained against axial movement by the engagement of their outer ends 22 with the bracket members 24.

The ground engaging unit 14 (Figs. 2 and 3) is comprised of a pair of V-shape members 28 and 29, formed with like angles but with the member 29 being smaller than the member 28 to provide for its arrangement in a nested relation within, and in the plane, of, the larger V-member 28. The side sections or legs 30 and 31 of the V-members 28 and 29, respectively, are of a channel shape in transverse cross section and with the legs 32 of the side sections 29 and 30 being extended downwardly. The members 28 and 29 are connected together in their nested relation by a transverse connecting member 33 which is attached to the top sides or base sections 34 of the leg sections 30 and 31 by welding or like means. The junction of the inner adjacent ends of the side sections 30 of the V-member 28 is defined by an upright plate or bar member 36 which is welded between the inner adjacent ends of the side sections 30 and projects forwardly from the apex 35 of the member 28. The bar member 36 has its projected end 37 of a sledlike contour so as to constitute a leading runner for the ground engaging unit 14.

Carried on the top side of the connecting member 33 (Fig. 2) are a plurality of transversely spaced tubular bearings 38 and 38a, for rotatably supporting a shaft 39, illustrated as four in number and with the bearings 38a located between the bearings 38. The tubular bearing sleeve 19 at the free end of the piston rod 18 is mounted on the shaft 39 at a position between the intermediate bearings 38a whereby to pivotally connect the cylinder assembly 13 with the ground engaging unit 14 at the shaft 39.

The pivoted frame 16 is of a substantially U-shape and includes side or leg members 41 and a base or end member 42 (Fig. 3). The leg members 41 terminate in transverse tubular bearings 43 which are mounted on the shaft 39 at positions inwardly of the tubular bearings 38 on the ground engaging unit 14, so as to be located between each pair of adjacent bearings 38 and 38a. Collars 44 carried on the shaft 39 to the inside of each tubular bearing 43 are rigidly secured to the shaft 39 by friction screws 46 and hold the bearings 43 against corresponding bearings 38 whereby the shaft 39 is held against axial movement.

The base or end member 42 of the pivoted frame 16 has projecting end sections 47 which constitute stub shafts that are rotatably received within bearings 23a provided with securing brackets 24a. The brackets 24a are secured to the vehicle frame members 11 in all respects similar to the brackets 24 and the bearings 23 for the cylinder assembly stub shafts 21.

The leg members 41 of the pivoted frame 16 are connected together by a criss-cross brace structure 49 and a transverse brace member 51. A coil spring 52 is connected under tension between the brace bar 51 and the forward end 37 of the runner member 36 to yieldably urge the front or apex end of the ground engaging unit 14 toward the frame 16.

The cylinder 17 is of double acting type and fluid under pressure is supplied thereto through supply lines 53 and 54 (Fig. 4) from a fluid pump unit indicated at 56, suitably carried on the vehicle 10. The fluid supply to the cylinder 17 is controlled through a valve mechanism 57, having a fluid inlet connection 58, and a fluid outlet connection 59, which are connected to the pump inlet 61 and the pump outlet 62, respectively. The supply lines 53 and 54 are connected to the valve mechanism 57 which operates in a well known manner such that when fluid under pressure is admitted to one of the supply lines 53 and 54, fluid is released from the other supply line.

The vehicle wheels 12 are provided with usual brakes 55, which operate in a usual manner. As shown in Fig. 4 the fluid control system for the brakes 55 includes a supply and release line 63, connected to a valve control mechanism 64, having a fluid connection 66 with the pump outlet and a fluid connection 67 with the pump inlet 61. The valve control mechanisms 56 and 64 are located at positions for convenient access to the tractor operator.

In the use of the attachment of this invention, for a normal operation of the vehicle, the ground engaging unit 14 is maintained in an elevated position substantially at the level of the axle 71 for the wheels 12 so as not to impair the normal clearance of the under parts of the vehicle with the ground, and with this elevated position being shown in dotted lines in Fig. 1. The ground engaging unit 14 is moved to its dotted lined position shown in Fig. 1 on the supply of fluid under pressure to the supply line 54 to provide for a retraction of the piston rod 18 within the cylinder 17.

The bracket members 24a are secured to the frame members 11 at positions spaced forwardly from the bracket members 24 so that on retraction of the piston rod 18 the cylinder assembly 13 and the pivoted guide frame 16 are moved upwardly and rearwardly toward the vehicle frame 10. The spring 52 functions to yieldably hold the ground engaging unit 14 in a substantially horizontal position.

When the braking action of the attachment is to be applied, fluid under pressure is supplied to the cylinder 17 through the supply line 53 and on downward extension of the piston rod 18 the assembly 13 and pivoted guiding frame 16 are pivoted downwardly and forwardly to move the unit 14 into frictional engagement with the ground indicated at 72. The apices of the V-members 28 and 29 point toward the front of the vehicle, and in the downward movement of the unit 14 against the ground 72, are prevented from digging into the ground by the action of the spring 52. It is to be noted further that the cross connecting member 33, and as best appears from Fig. 1, is located adjacent to the rear end of the ground engaging unit 14. Thus as pressure is applied against the unit 14, the front end of the unit 14 tends to tip upwardly and rearwardly to complement the action of the spring 52.

By virtue of the downward projection of the leg portions 32 on the side sections 30 and 31 of the V-members 28 and 29, respectively, the legs 32 function as upright cleats or lugs to frictionally engage the ground in much the same manner as an ice skater or hockey player uses in bringing himself to a stop. The cleats or upright legs 32 are arranged in a parallel relation with their respective side portions 30 and 31 to accomplish what might be called a shearing action rather than a scraping action with the ground 72, since it will readily be appreciated that with the legs 32 arranged transversely of the direction of advance of the vehicle a braking action would take place to such an extent as to not only impair the braking action, but which would impair the safety and maneuverability of the vehicle.

In one embodiment of the invention the pivoted guiding frame 16 is about eight feet in length and the side members 41 are constructed of a three inch pipe material. For this embodiment each side portion 30 of the V-member 28 is constructed from a five inch channel member, two and one half feet long. It is contemplated that the attachment be mounted on the vehicle frame 10 forwardly of the vehicle rear wheels 12 and at a distance to provide adequate clearance between the ground engaging unit 14, and the rear wheel axle structure 71 when the unit 14 is moved to its upward or carrying position.

From the above description it is seen that the invention provides an anti-skid and braking attachment which is of a simple and compact construction, and readily and easily installed on trucks, busses and like vehicles. The ground engaging unit 14 is of a construction to efficiently frictionally engage ice, dirt or concrete to bring the vehicle to a halt, or to maintain the vehicle at a stopped position. It is to be noted that the angle of the V-members 28 and 29 is such that the cleats 32 are equally efficient in engaging the ground to hold or stop the vehicle against movement in either a forward or rearward direction. In those instances where the attachment is to be applied to vehicles having a direct driving connection with the rear axle thereof, a pair of cylinder assemblies 13 may be used and arranged to opposite sides of the longitudinally extended drive connection.

Although the invention has been described with respect to a preferred embodiment thereof it is to be understood that it is not to be so limited since changes can be made therein which are within the full intended scope of this invention as defined by the appended claim.

I claim:

A brake and anti-skid attachment for a vehicle comprising a hydraulic cylinder assembly, means for pivotally suspending said cylinder assembly from said vehicle for pivotal movement about an axis extended transversely of said cylinder assembly, a ground engaging unit comprising a horizontal frame member pivotally attached intermediate its ends to the free end of the piston of said cylinder assembly such that when said cylinder assembly is in a substantially upright position and said piston is extended said ground engaging unit engages the ground, a pair of forwardly converging upright ground engaging side portions extended downwardly from the bottom of said frame member, an upright front portion common to the forward ends of said ground engaging side portions, and means adapted to be attached at one of its ends to said vehicle and pivotally attached at its opposite end to said ground engaging unit to guide said unit in its downward travel to said ground engaging position.

References Cited in the file of this patent

UNITED STATES PATENTS

| Number | Name | Date |
|---|---|---|
| 1,625,226 | Simmons | Apr. 19, 1927 |
| 1,719,313 | Scott | July 2, 1929 |
| 2,062,931 | Raffa | Dec. 1, 1936 |
| 2,459,016 | Cohen | Jan. 11, 1949 |
| 2,513,691 | Tower | July 4, 1950 |

FOREIGN PATENTS

| Number | Country | Date |
|---|---|---|
| 351,819 | France | May 15, 1905 |
| 702,041 | Germany | Jan. 30, 1941 |
| 702,240 | Germany | Feb. 3, 1941 |
| 703,138 | Germany | Mar. 1, 1941 |
| 7,130 | Great Britain | Mar. 22, 1911 |
| 316,963 | Great Britain | Aug. 7, 1929 |